Feb. 24, 1942.　　　　O. W. PINEO　　　　2,273,987
DIRECT CURRENT AMPLIFIER
Filed May 14, 1940
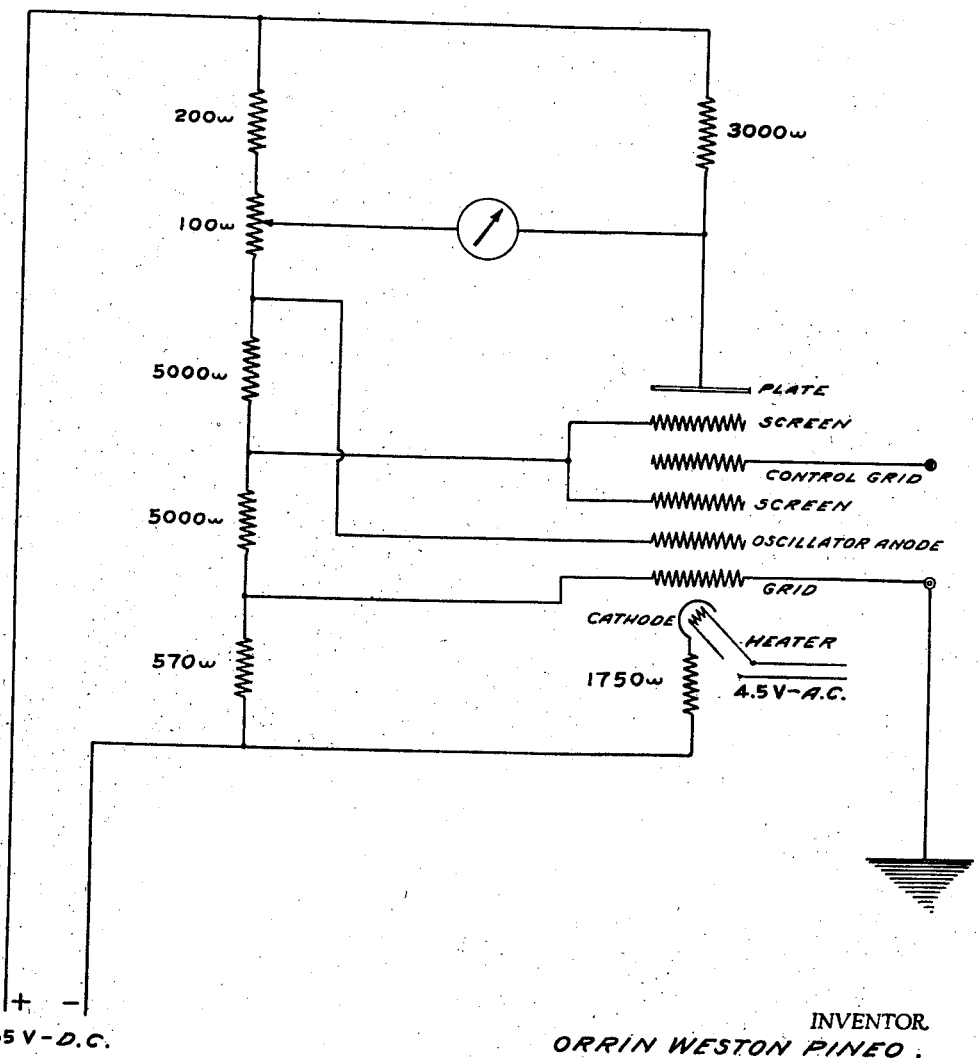
INVENTOR.
ORRIN WESTON PINEO,
BY
ATTORNEY.

Patented Feb. 24, 1942

2,273,987

UNITED STATES PATENT OFFICE 2,273,987

DIRECT CURRENT AMPLIFIER

Orrin Weston Pineo, Milo, Maine, assignor to American Cyanamid Company, New York, N. Y., a corporation of Maine Application May 14, 1940, Serial No. 335,073

4 Claims. (Cl. 179—171)

This invention relates to direct current amplifiers of the vacuum tube voltmeter or current meter type.

The amplification of very small direct current differences presents a serious problem which arises particularly with differential spectrophotometers and colorimeters requiring the measurement of minute difference currents or voltages from a pair of photocells. Such sensitive measurements require a device which is relatively insensitive to changes in electrical conditions in the measuring instrument itself. High sensitivity requires amplification of small potential or current differences and in general such amplification can only be practically effected by using some type of thermionic amplifier. The ordinary vacuum tube direct current voltmeter, in which a current meter indicates amplified current changes in the plate circuit resulting from much smaller changes in the grid circuit is not suitable for precise measurements of difference currents or potentials, because of instrumental errors due to variations in the electrical conditions of the instrument itself and to variation in its supply voltages.

One of the difficulties involved in a Wheatstone bridge type of amplifier containing thermionic vacuum tubes, is that the tubes are very sensitive to changes in the amount of current flowing through their cathode heaters, and it is practically impossible to get any two tubes in which the variations in cathode emission with changes in heater current are sufficiently alike to be mutually compensating.

According to the present invention a direct current Wheatstone bridge amplifier is built with the two vacuum tube bridge arms in a single multipurpose vacuum tube having two anodes in the same electron stream from a common cathode, at least one of the anodes being of the screen or grid variety permitting electrons to pass through it as well as to be attracted to it. The present invention is not limited to the use of any particular tube of this type, but I have found that the ordinary pentagrid converter varieties such as are used in superheterodyne receiving sets where a combined oscillator and mixer tube is required, give excellent results and throughout the rest of this specification the invention will be described in conjunction with this type of tube of which is 6A7 is a typical one in the 6.3 volt series.

In the amplifier, according to the present invention, the Wheatstone bridge contains two resistance arms connected at their junction to a suitable source of positive direct current potential with the separate ends of the resistances connected respectively to the oscillator anode grid and to the solid plate of a pentagrid tube. A sensitive galvanometer or other similar current indicating device is connected across the bridge, preferably to a movable contact on one of the resistance arms to permit initial balancing of the bridge. A voltage divider across the direct current supply provides fixed screen and oscillator grid potentials. This divider is preferably combined with the bridge resistance arm to the anode. Current from the cathode passes through a resistor to the low-potential point of the direct current supply. The direct current signal which is to be measured is then impressed between the oscillator and control grids, the former of which in the usual amplifier design is grounded. The total current passing through the tube is largely determined by the oscillator grid potential and the cathode resistor. The division of current between the screen and the plate of the tube is largely determined by the potential of the control grid relative to the oscillator grid, i. e., by the input signal.

Changes in heater current will affect cathode emission, and correspondingly the total current flow through the tube. These changes, however, will be similar for both bridge arms in the tube because both anodes are located in the same electron stream. Variations in indication of the galvanometer with changes of heater current are therefore reduced to a point very materially below that which is possible with the same degree of current supply regulation in an amplifier of a bridge type having separate vacuum tube arms. Even more close regulation is possible over extended ranges of heater current by a further refinement of the amplifier which forms a more specific feature of the present invention. If a curve is made showing the variation of galvanometer reading with change in heater current when a constant signal is impressed on the control grid, it is not in general a straight line and its shape can be markedly influenced by the value of the oscillator grid bias and the cathode resistor. By varying these values together in a way to maintain constant cathode current, an optimum condition can be found for which the galvanometer reading as a function of heater current has zero slope at an inversion point. The optimum conditions for different individual tubes of a given type are quite similar. Thus, the changes in galvanometer indication with changes of heater current over a considerable range will be very small and over a moderate range practically negligible. This constitutes the most completely compensated amplifier which can be made according to the present invention and constitutes, therefore, the preferred embodiment thereof. An amplifier having a stability materially greater than ordinary bridge amplifiers can be obtained even if no attempt is made to operate the tube at a point of negligible slope on the galvanometer reading vs. heater current curve.

Amplifiers of the present invention are not immune to fluctuations resulting from variations in D. C. supply voltage. The fact that fluctuations in supply voltage are not automatically compensated for by the amplifier of the present invention is of little practical moment since supply voltages can be obtained which are extremely constant because we are dealing here with electric circuits of fairly high voltage and very low current. On the other hand, it is much more difficult to obtain equally good regulation of heater current through the low voltage high current heater circuits.

It is an advantage of the present invention that the adjustment of the oscillator grid bias and the cathode resistor is not critical and it is comparatively simple to find the optimum condition for any heater voltage. In general, some change is necessary with different tubes of the same type. This is easily obtained by using variable resistances in the voltage divider and cathode resistor, and once their optimum settings have been determined for a particular tube, other tubes of the same type may be accommodated with only moderate changes in the settings. The invention is not critical with respect to tube electrode voltages, but in general I have found that it is desirable for maximum input resistance to operate at a fairly low tube voltage. The total direct current supply voltage may advantageously be of the order of magnitude of 65 volts, giving about 60 volts across the tube. The use of moderate tube voltages slightly reduces the transconductance of the tube to 500 micromhos but the high input resistance of 500 megohms is desirable in most applications. Thus currents around $10^{-14}$ amperes can be measured by the amplifier of the present invention since its stability over hours is around 10 microvolts equivalent input. Galvanometer sensitivity of $10^{-8}$ amp./div. is sufficient.

The drawing shows a circuit for an amplifier, the values being suitable for a 6A7 tube. As shown in the drawing the tube is operated at a reduced heater voltage of 4.5 volts A. C. for high input resistance.

What I claim is:

1. A vacuum tube amplifying device for measuring small direct current voltages comprising a direct current supply, a thermionic vacuum tube having two anodes of which one is a grid anode and two corresponding control grids all located in the same electron stream from a single cathode, resistance arms of a Wheatstone bridge circuit connected at their junction to the supply and at their opposite ends respectively to the anodes of the tube, means for impressing a suitable grid bias on the grid anode control grid, an input circuit for impressing a direct current signal voltage to be measured between the grid anode control grid and the other anode control grid and a current indicator across the resistance arms of the bridge.

2. An amplifying device according to claim 1 in which the grid bias is produced by the voltage difference between the drop, large compared with the grid bias, in a cathode resistor and a fraction of the supply voltage impressed between the low potential end of the resistor and the grid anode control grid, the magnitude of cathode resistor and said fraction of the supply voltage being chosen so that the amplifier operates normally in a condition where the rate of change of indicator current with heater current is substantially zero.

3. An amplifying device according to claim 1 in which the grid bias is produced by the voltage difference between the drop, large compared with the grid bias, in a cathode resistor and a fraction of the supply voltage impressed between the low potential end of the resistor and the grid anode control grid, the magnitude of cathode resistor and said fraction of the supply voltage being chosen so that the amplifier operates normally in a condition where the rate of change of indicator current with heater current is substantially zero, and a direct connection from the biased grid to the ground.

4. An amplifying device according to claim 1 in which a voltage divider resistance net work is connected between high and low potential points of the direct current supply and the grid bias is produced by the voltage difference between the drop, large compared with grid bias, in the cathode resistor and the voltage drop through a portion of the voltage divider net work, the magnitude of the cathode resistor and said voltage drop being chosen so that the amplifier operates normally in the condition where the rate of change of the indicator current with cathode temperature is substantially zero.

ORRIN WESTON PINEO.